United States Patent [19]

Shinohara et al.

[11] Patent Number: 5,399,205
[45] Date of Patent: Mar. 21, 1995

[54] METHOD FOR CLEANSING AND LUSTERING A SURFACE

[75] Inventors: Seigo Shinohara, Chigasaki; Kiyoshi Okamura, Fujisawa; Tetsuo Kijima, Machida, all of Japan

[73] Assignee: Taiho Industries Co., Ltd., Tokyo, Japan

[21] Appl. No.: 171,155

[22] Filed: Dec. 22, 1993

[30] Foreign Application Priority Data

Dec. 22, 1992 [JP] Japan ................. 4-356577

[51] Int. Cl.⁶ .................. B08B 7/00; C23G 5/00
[52] U.S. Cl. ..................... 134/40; 134/42; 252/174.15
[58] Field of Search ............. 134/40, 42; 252/174.15

[56] References Cited

U.S. PATENT DOCUMENTS

| | | | |
|---|---|---|---|
| 4,010,110 | 3/1977 | Cosentino et al. | 252/314 |
| 4,269,739 | 5/1981 | Grejsner | 252/547 |
| 4,374,745 | 2/1983 | Sibley et al. | 252/106 |
| 4,675,125 | 6/1987 | Sturwold | 252/118 |
| 4,880,557 | 11/1989 | Ohara et al. | 252/174.15 |

FOREIGN PATENT DOCUMENTS 63-51499  3/1988  Japan.
64-11175  1/1989  Japan.

*Primary Examiner*—Melvyn J. Andrews
*Assistant Examiner*—Zeinab El-Arini
*Attorney, Agent, or Firm*—Oblon, Spivak, McClelland, Maier & Neustadt

[57] ABSTRACT

A method for cleansing and lustering a surface comprises spraying on the surface a cleansing-lustering agent essentially consisting of lanolin and an O/W emulsion composed of an emulsifying agent, a silicone oil and water thereby depositing a foamed mass of the cleansing-lustering agent on said surface and allowing the foamed mass to defoam spontaneously after a prescribed period of standing and cleanse the surface. A foaming cleansing-lustering agent is disclosed which essentially consists of lanolin and an O/W emulsion composed of an emulsifying agent, a silicone oil and water.

8 Claims, No Drawings

METHOD FOR CLEANSING AND LUSTERING A SURFACE

BACKGROUND OF THE INVENTION

1. Field of the Invention

This invention relates to a cleansing-lustering method and a cleansing-lustering agent for working the method. More particularly, this invention relates to a method for foaming a cleansing-lustering agent on the surface of tires such as of automobiles and bicycles thereby cleansing the tires of dirt and, at the same time, imparting luster thereto, a method for controlling the period of the foamed state of the agent, and a cleansing-lustering agent for working the method.

2. Description of the Prior Art

Generally, a dirty automobile tire is cleansed of dirt by first brushing and washing the tire with water thereby ridding the tire of dust, mud, etc., then spraying a spray type lustering agent on the tire, and finally wiping the sprayed lustering agent off the tire as with a towel.

Methods of this sort are disadvantageous because the brushing action may scratch the coating of an aluminum wheel used with the tire. The spray type cleansing-lustering agents heretofore known to the art are those of the solvent type produced by dissolving silicone oil in petroleum type solvents and chlorine type solvents and those of the O/W emulsion type produced by emulsifying silicone oil with water. The solvent type agents feature a quick-drying property but have the drawback of causing the rubber of the tire to swell. Further, on account of the use of a volatile solvent, these agents may adversely affect the health of workers handling the agents.

The O/W emulsion type cleansing-lustering agents, though having no adverse effect on tires, have the disadvantage that the foam of the sprayed agent does not easily vanish and, therefore, must be wiped off the surface as with a towel.

Now, examples of the cleansing agents well known in the art will be described below.

U.S. Pat. No. 4,010,110 discloses a composition of the type intended as a cleansing agent and adapted from the beginning to produce no foam. U.S. Pat. No. 4,269,739 discloses a composition as a cleansing agent. It contains no mention anywhere of the condition of foaming and defoaming of this composition prepared in the form of an aerosol. U.S. Pat. No. 4,374,745 discloses a composition as a cleansing agent and makes no mention anywhere of the state of foam to be produced when the composition is prepared in the form of an aerosol. This composition, when prepared in the form of gel or in a thixotropic form, does not foam after the fashion of an aerosol. U.S. Pat. No. 4,675,125 discloses a composition as a cleansing agent. Though this composition uses a defoaming agent, the defoaming agent is used therein solely for the purpose of eliminating the inconvenience of foam to be otherwise encountered during the manufacture or use of the composition. This U.S. patent, therefore, contains no mention anywhere of any foam in the form of aerosol. The four U.S. patents mentioned above aim to prevent the relevant compositions from foaming by the incorporation of a foam adjusting agent.

The present inventors formerly disclosed their inventions concerning O/W emulsion type cleansing agents in Japanese Patent Public Disclosure SHO 63(1988)-51499 and SHO 64(1989)-11175 and further secured grant of U.S. Pat. No. 4,880,557 on their US patent application claiming Convention priority on Japanese Patent Public Disclosure SHO 63(1988)-51499 (Japanese Patent Application SHO 61(1986)-194038). These inventions all relate to methods based on a procedure which comprises spraying a cleansing agent on a given surface to be cleaned, allowing the agent deposited on the surface to foam and then spontaneously defoam into a liquid state, and permitting the liquid to flow down the surface while cleansing and lustering the surface.

There is, however, a need to adjust the foam retention time in this process, particularly to shorten the time required for the cleansing and lustering.

The present inventors therefore made a study with a view to developing a cleansing-lustering agent and a cleansing-lustering method capable of responding to this need. They have consequently accomplished this invention.

SUMMARY OF THE INVENTION

To be specific, this invention relates to a method for cleansing and lustering a given surface by spraying on the surface a cleansing-lustering agent essentially consisting of lanolin and an O/W emulsion composed of an emulsifying agent, a silicone oil and water thereby depositing a foamed mass of the cleansing-lustering agent on the surface and, after a fixed period of standing thereof, enabling the foamed mass to defoam and cleanse and luster the surface, and a foaming cleansing-lustering agent essentially consisting of lanolin and an O/W emulsion composed of an emulsifying agent, a silicone oil and water and used for working the method mentioned above. The method is characterized by the ability of the cleansing-lustering agent used therein to allow the period of deposition of the foamed mass thereof (the foam retention period) to be controlled by adjusting the lanolin content of the cleansing-lustering agent. None of the other cleansing-lustering agents has this ability.

DESCRIPTION OF THE PREFERRED EMBODIMENT

The silicone oils which are effectively usable in this invention include not only ordinary dimethyl silicone oil but also phenylmethyl silicone oil, alkyl-modified silicone oils, and amino-modified silicone oils, for example.

Such a silicone oil is used in an emulsified form. As an emulsifying agent for emulsifying the silicone oil, an anionic or nonionic surfactant is used. As particularly desirable examples of the emulsifying agent, alkylbenzene sulfonates, polyoxy ethylene alkylphenyl ethers, and polyoxy ethylene alkyl ethers may be cited.

The cleansing-lustering agent according to this invention has an O/W emulsion which is formed by mixing a silicone oil with an emulsifying agent and water.

This cleansing-lustering agent is characterized by the fact that this emulsion incorporates lanolin therein as an additive.

Now, the cleansing-lustering agent according to the present invention will be described below.

The O/W emulsion is only required to possess an ability to cleanse and luster a surface. The present invention does not particularly specify the composition of the O/W emulsion.

The lanolin added to the O/W emulsion is produced by separating the fatty secretion adhering to wool as with soap or solvent and refining the separated secretion. Chemically, it is the ester of a complicated fatty acid with a monohydric higher alcohol.

Either crude lanolin or purified lanolin can be effectively used in this invention. When the crude lanolin used has not been sufficiently purified, its color and odor degrade, its commercial value. Thus, it is desirable to use refined lanolin which is free from the odor and color.

In this invention, the cleansing-lustering agent is charged into a pressure container together with a propellant and then is sprayed from the pressure container on a given object. In other words, the cleansing-lustering agent coexists with the propellant under pressure. Liquefied petroleum gas, dimethyl ether, nitrogen gas, etc. are practically suitable as the propellant. The lanolin in the emulsified form coexists stably with the propellant. When the cleansing-lustering agent is discharged from the pressure container toward the surface of a given object, the emulsion is foamed and deposited on the surface by the force of dispersion of the spray gas. The emulsion thus deposited on the surface remains in the foamed state for a while after the deposition on the surface. Then, it gradually vanishes and liquefies and consequently absorbs the defiling substances on the surface. Meanwhile, part of the silicone oil lands on the surface and then spontaneously flows down the surface and simultaneously lusters it. When the lanolin content of the cleansing-lustering agent is adjusted properly, the period of duration of the foamed state can be controlled to maintain or even improve the effect of cleansing and lustering. Actually, the adjustment of the lanolin content results in curtailing the duration of the formed state. Specifically, the duration of the foamed state which is at least three minutes and normally about five minutes when the lanolin content is zero can be decreased to approximately the range of 5 to 120 seconds when the cleansing-lustering agent has a properly adjusted lanolin content.

The lanolin brings about the effect mentioned above because it gives rise to highly stable emulsification in the aerosol.

The amount of lanolin incorporated in the cleansing-lustering agent of this invention is in the range of 1 to 40% by weight, based on the total amount of the silicone oil and the emulsifying agent which together compose the emulsion. If the amount of lanolin added is less than the lower limit of the range specified above, the added lanolin manifests no discernible effect. Conversely, if the amount exceeds the upper limit of the range, the duration of the foamed state is extremely short and the cleansing-lustering agent therefore does not produce a sufficient cleansing effect and tends to make the treated surface sticky. From the practical point of view, it is particularly preferable for the lanolin content to be in the range of 5 to 25% by weight.

In the method of this invention, the composition of the O/W emulsion in the cleansing-lustering agent is not particularly specified. Practically, however, it is preferably composed of 5 to 60% by weight of silicone oil, 0.5 to 10% by weight of an emulsifying agent, and the balance of water. More preferably, the O/W emulsion has a silicone oil content in the range of 10 to 25% by weight and an emulsifying agent content in the range of 5 to 10% by weight.

Though the ratio of the O/W emulsion to the propellant is not particularly defined, it is practically desirable to set the volumetric ratio of the O/W emulsion (containing lanolin) to the propellant in the range of 95:5 to 70:30.

This invention will now be described with reference to working examples and comparative experiments.

EXAMPLE 1

A cleansing-lustering agent of the following formula:

| | |
|---|---|
| Dimethyl silicone oil (1000 C/S) (produced by Toray Silicone Co., Ltd. and marketed under the tradename "Toray Silicone") | 20.0% by weight |
| Polyoxyethylene alkylphenyl ether (produced by Dai-ichi Seiyaku Kogyo Co., Ltd. and marketed under the tradename "Neugen EA-140") | 5.0% by weight |
| Lanolin | 1.0% by weight |
| Water | Balance | and LPG in respective amounts accounting for a volumetric ratio of 90:10 were together charged into a spray can under a pressure of 3.5 kg/cm$^2$.

Then, the content of the spray can was sprayed for 10 seconds on a tire smeared with earth as the defiling substance to be removed. The surface of the tire was covered with the foam which was produced in consequence of the spray. The foam remained intact for two minutes and then vanished. The liquid which was consequently formed flowed down the surface of the tire.

The tire surface was thoroughly cleaned of the earth and, at the same time, was lustered. The composition of the cleansing-lustering agent used herein and the results of the use of this cleansing-lustering agent as a spray are shown in Table 1.

EXAMPLES 2 TO 4

Cleansing-lustering agents of the following compositions:

| | |
|---|---|
| Dimethyl silicone oil (1000 C/S) (produced by Toray Silicone Co., Ltd. and marketed under the tradename "Toray Silicone") | 20.0% by weight |
| Polyoxyethylene alkylphenyl ether (produced by Dai-ichi Kogyo Seiyaku Co., Ltd. and marketed under the tradename "Neugen EA-140") | 5.0% by weight |
| Lanolin in Example 2 | 2.0% by weight |
| Lanolin in Example 3 | 5.0% by weight |
| Lanolin in Example 4 | 10.0% by weight |
| Water | Balance | were treated by following the procedure of Example 1. The compositions of the cleansing-lustering agents, the duration of the foamed state, and the cleansing and lustering effects are shown in Table 1.

The results clearly indicate that the effect of reducing the period of duration of the foamed state increased in proportion as the lanolin content of the agent increased.

EXAMPLES 5 TO 7

Cleansing-lustering agents of the following compositions:

| Dimethyl silicone oil (produced by Toray Silicone Co., Ltd. and marketed under the tradename "Toray Silicone") (where the viscosity in Example 5 was 100 C/S, that in Example 6 was 5000, and that in Example 7 was 10000 C/S.) | 20.0% by weight |
|---|---|
| Polyoxyethylene alkylphenyl ether (produced by Dai-ichi Kogyo Seiyaku Co., Ltd. and marketed under the tradename "Neugen EA-140") | 5.0% by weight |
| Lanolin | 5.0% by weight |
| Water | Balance | were treated by following the procedure of Example 1. The compositions of the cleansing-lustering agents, the duration of the foamed state, and the cleansing-lustering agent are shown in Table 1.

The results indicate that the period of duration of the foamed state shorten discernibly, though slightly, in proportion as the viscosity of silicone oil increased.

EXAMPLES 8 TO 10

Cleansing-lustering agents of the following compositions:

| Dimethyl silicone oil (1000 C/S) (produced by Toray Silicone Co., Ltd. and marketed under the tradename "Toray Silicone") | 20.0% by weight |
|---|---|
| Polyoxyethylene alkylphenyl ether (produced by Dai-ichi Kogyo Seiyaku Co., Ltd. and marketed under the tradename "Neugen ET-135") | 5.0% by weight |
| Lanolin in Example 8 | 2.0% by weight |
| Lanolin in Example 9 | 5.0% by weight |
| Lanolin in Example 10 | 10.0% by weight |
| Water | Balance | were treated by following the procedure of Example 1. The compositions of the cleansing-lustering agents, the duration of the foamed state, and the cleansing-lustering effects are shown in Table 1.

The results clearly indicate that the effect of reducing the period of duration of the foamed state increased in proportion as the lanolin content increased.

Comparative Experiment 1

The procedures of Examples 1 to 4 were repeated, except that the use of lanolin was omitted. The compositions of the cleansing-lustering agents and the results of use of the agents are shown in Table 1, along with those of the working examples.

Comparative Experiment 2

The procedure of Examples 8 to 10 were repeated, except that the use of lanolin was omitted. The compositions of the cleansing-lustering agents and the results of use of the agents are shown in Table 1, along with those of the working examples.

TABLE 1

|  |  | Example | | | | | | | | | | Comparative Experiment | |
|---|---|---|---|---|---|---|---|---|---|---|---|---|---|
|  |  | 1 | 2 | 3 | 4 | 5 | 6 | 7 | 8 | 9 | 10 | 1 | 2 |
| Silicone oil | Dimethyl silicone oil 1000 C/S (wt %) | 20 | 20 | 20 | 20 |  |  |  | 20 | 20 | 20 | 20 | 20 |
|  | Dimethyl silicone oil 100 C/S (wt %) |  |  |  |  | 20 |  |  |  |  |  |  |  |
|  | Dimethyl silicone oil 5000 C/S (wt %) |  |  |  |  |  | 20 |  |  |  |  |  |  |
|  | Dimethyl silicone oil 10000 C/S (wt %) |  |  |  |  |  |  | 20 |  |  |  |  |  |
| Emulsifying agent | Polyoxyethylene alkylphenyl ether (wt %) | 5 | 5 | 5 | 5 | 5 | 5 | 5 |  |  |  | 5 |  |
|  | Polyoxyethylene alkyl ether (wt %) |  |  |  |  |  |  |  | 5 | 5 | 5 |  | 5 |
| Lanolin | (wt %) | 1 | 2 | 5 | 10 | 5 | 5 | 5 | 2 | 5 | 10 |  |  |
|  | (wt % based on total amount of silicone oil and emulsifying agent) | 4 | 8 | 20 | 40 | 20 | 20 | 20 | 8 | 20 | 40 |  |  |
| Water (Bal = balance) |  | Bal | Bal | Bal | Bal | Bal | Bal | Bal | Bal | Bal | Bal | Bal | Bal |
| Spraying effect | Duration of foamed state (sec.) | 120 | 60 | 30 | 5 | 40 | 25 | 20 | 60 | 30 | 5 | >180 | >180 |
|  | Cleansing property | o | o | o | Δ | o | o | o | o | o | Δ | o | o |
|  | Luster | o | o | o | o | o | o | o | o | o | o | o | o |
|  | Unevenness of finish | Δ | o | o | o | o | o | o | o | o | o | x | x |

The cleansing property and the luster were visually evaluated and rated on a three-point scale, wherein o stands for good, Δ for rather good, and x for bad. The unevenness of finish was evaluated in terms of the ratio of wet surface to the whole tire surface and rated on a three-point scale, wherein o stands for not less than 90%, Δ for not less than 85% but less than 90%, and x for less than 85%.

EXAMPLES 11 TO 17

Cleansing-lustering agents were produced by following the procedure of Example 1, except that the composition of the agent were varied as shown in Table 2. The produced agents were used to clean a tire smeared with earth. The results are shown in Table 2.

Comparative Experiments 3 TO 7

Cleansing agents were produced by following the procedure of Comparative Experiment 1, except that the composition of the agent were varied as shown in Table 2. The produced agents were used to clean a tire smeared with earth. The results are shown in Table 2.

TABLE 2

|  |  | Example | | | | | | | Comparative Experiment | | | | |
|---|---|---|---|---|---|---|---|---|---|---|---|---|---|
|  |  | 11 | 12 | 13 | 14 | 15 | 16 | 17 | 3 | 4 | 5 | 6 | 7 |
| Silicone oil | Dimethyl silicone coil 1000 C/S (wt %) |  |  |  |  | 20 | 20 | 20 | 20 | 20 | 20 | 20 | 20 |
|  | Alkyl-modified silicone oil (Toray SH 203) (wt %) | 20 |  |  |  |  |  |  |  |  |  |  |  |
|  | Amino-modified silicone oil (Toray |  | 20 |  |  |  |  |  |  |  |  |  |  |

TABLE 2-continued

| | | Example | | | | | | | Comparative Experiment | | | |
|---|---|---|---|---|---|---|---|---|---|---|---|---|
| | | 11 | 12 | 13 | 14 | 15 | 16 | 17 | 3 | 4 | 5 | 6 | 7 |
| | SF 8417) (wt %) | | | | | | | | | | | | |
| | Carboxy-modified silicone oil (Toray SF 8418) (wt %) | | | 20 | | | | | | | | | |
| | Alcohol-modified silicone oil (Toray SF 8427) (wt %) | | | | 20 | | | | | | | | |
| Emulsifying agent | Polyoxyethylene alkylphenyl ether (wt %) | 5 | 5 | 5 | 5 | | | | 5 | 5 | | | |
| | Alkylbenzene sulfonic acid triethanol amine (wt %) | | | | | 5 | | | | | 5 | | |
| | Sodium di-2-ethylhexyl sulfosuccinate (wt %) | | | | | | 5 | | | | | 5 | |
| | Polyoxyethylene sorbitan monolate (wt %) | | | | | | | 5 | | | | | 5 |
| Lanolin | (wt %) | 5 | 5 | 5 | 5 | 5 | 5 | 5 | | | | | |
| | Wt % based on total amount of silicone oil and emulsifying agent | 20 | 20 | 20 | 20 | 20 | 20 | 20 | | | | | |
| Cattle tallow | | | | | | | | | 5 | | | | |
| Lard | | | | | | | | | | 5 | | | |
| Water (Bal = Balance) | | Bal | Bal | Bal | Bal | Bal | Bal | Bal | Bal | Bal | Bal | Bal | Bal |

The results of the working examples and comparative experiments show that a foaming cleansing-lustering agent using as an active component thereof a silicone oil incorporating lanolin therein, when sprayed on a given surface for cleaning, manifests an improved cleansing and lustering effect on the surface and, at the same time, permits the foamed state of the sprayed agent to be controlled and curtails the period of the foamed state by adjusting the composition of the agent.

What is claimed is:

1. A method for cleansing and lustering a surface of a tire, which method comprises spraying on said surface a cleansing-lustering agent consisting essentially of lanolin and an oil-in-water emulsion composed of an emulsifying agent, a silicone oil and water, thereby depositing a foamed mass of said cleansing-lustering agent on said surface and allowing said foamed mass to deform spontaneously and cleanse said surface.

2. A method according to claim 1, wherein the period of deposition of said foamed mass on said surface is controlled by adjusting the amount of lanolin based on the total amount of said emulsifying agent and said silicone oil which together compose said oil-in-water emulsion.

3. A method according to claim 1, wherein the amount of lanolin is in the range of 1 to 40% by weight, based on the total amount of said emulsifying agent and said silicone oil which together compose said oil-in-water emulsion.

4. A method according to claim 3, wherein the amount of lanolin is in the range of 5 to 25% by weight based on the total amount of said emulsifying agent and said silicone oil.

5. A method according to claim 1, wherein said emulsifying agent is at least one member selected from the group consisting of anionic surfactants and nonionic surfactants.

6. A method according to claim 5, wherein said surfactant is at least one member selected from the group consisting of alkylbenzene sulfonates, polyoxyethylene alkylphenyl ethers, and polyoxyethylene alkyl ethers.

7. A method according to claim 1, wherein said silicone oil is at least one member selected from the group consisting of dimethyl silicone oil, phenylmethyl silicone oil, alkyl-modified silicone oil, and amino-modified silicone oil.

8. A method according to claim 7, wherein said silicon oil is dimethyl silicone oil.

* * * * *